United States Patent
Baker et al.

(10) Patent No.: US 9,497,777 B2
(45) Date of Patent: Nov. 15, 2016

(54) INDICATING E-DCH RESOURCES FOR E-RACH

(75) Inventors: Matthew P. J. Baker, Canterbury (GB); Timothy J. Moulsley, Caterham (GB)

(73) Assignee: Koninklijke Philips N.V., Eindhoven (NL)

( * ) Notice: Subject to any disclaimer, the term of this patent is extended or adjusted under 35 U.S.C. 154(b) by 391 days.

(21) Appl. No.: 12/739,416

(22) PCT Filed: Oct. 28, 2008

(86) PCT No.: PCT/IB2008/054446
§ 371 (c)(1),
(2), (4) Date: Apr. 23, 2010

(87) PCT Pub. No.: WO2009/057044
PCT Pub. Date: May 7, 2009

(65) Prior Publication Data
US 2010/0203915 A1   Aug. 12, 2010

(30) Foreign Application Priority Data

Nov. 1, 2007  (EP) .................................. 07119839
Jan. 10, 2008  (EP) .................................. 08300024

(51) Int. Cl.
*H04W 72/00* (2009.01)
*H04W 74/00* (2009.01)
*H04W 74/08* (2009.01)

(52) U.S. Cl.
CPC ....... *H04W 74/006* (2013.01); *H04W 74/0866* (2013.01)

(58) Field of Classification Search
CPC .................... H04W 74/0833; H04W 74/0866; H04W 72/04
USPC ...................................... 455/450, 451, 452.1
See application file for complete search history.

(56) References Cited

U.S. PATENT DOCUMENTS

| 5,881,092 A | 3/1999 | Gibson |
| 6,108,550 A | 8/2000 | Wiorek et al. |

(Continued)

FOREIGN PATENT DOCUMENTS

| CN | 1688894 A | 10/2005 |
| DE | 10232177 B3 | 3/2004 |

(Continued)

OTHER PUBLICATIONS

LG Electronics: "Discussion on RACH Enhancments"; 3GPP TSG-RAN #59Bis, R2-074165, Oct. 8, 2007, Retrieved From the Internet:URL:www.3gpp.org>, 2 Page Document.

Nokia, Nokia Siemens Networks: "Resource Assignment for E-DCH Access in CELL_FACH State" 3GPP TSG-RAN WG1 Meeting #50-BIS, R1-074303, Oct. 8, 2007, Retrieved From the Internet: URL:www.3gpp.org>, 5 Page Document.

Philips: "Enhanced Uplink for CELL_FACH"; 3GPP TSG-RAN WGl Meeting #51, R1-074976, Nov. 5, 2007, Retrieved From the Internet:URL:www.3gpp.org>, 3 Page Document.

(Continued)

*Primary Examiner* — Tu X Nguyen (57) ABSTRACT

In UMTS WCDMA a new RACH-based uplink is being discussed. The request for uplink transmission resource is made using a mechanism based on the conventional RACH. The main difference from the conventional RACH is that the data transmission uses a high-speed uplink packet data channel, known as Enhanced Dedicated Channel (E-DCH), instead of a single short message associated directly with the RACH preamble. One proposed scheme for indicating the E-DCH resources to be used creates a link between the values of each of a group of multiple signatures sent on the AICH (to acknowledge the E-RACH access) and a specific set of E-DCH parameters defined in a table. We propose to signal the set of resources to be used independently from acknowledging the E-RACH access. One possible method is to transmit information in the unused portion of the AICH (corresponding to 1024 chips every slot) indicating the resource set.

12 Claims, 3 Drawing Sheets

(56) References Cited

U.S. PATENT DOCUMENTS

| | | | |
|---|---|---|---|
| 6,188,351 | B1 | 2/2001 | Bloebaum |
| 6,594,242 | B1 | 7/2003 | Kransmo |
| 6,778,509 | B1 | 8/2004 | Ravishankar et al. |
| 6,993,344 | B2 | 1/2006 | Yotsumoto |
| 2006/0068782 | A1 | 3/2006 | Kuriyama |
| 2007/0038615 | A1 | 2/2007 | Vadon et al. |
| 2007/0147310 | A1* | 6/2007 | Cai ............... 370/335 |
| 2008/0159323 | A1 | 7/2008 | Rinne et al. |

FOREIGN PATENT DOCUMENTS

| | | | |
|---|---|---|---|
| GB | 2428545 | A | 3/2007 |
| JP | 2006100992 | A | 4/2006 |
| KR | 20070022072 | A | 2/2007 |
| WO | 9535638 | A1 | 12/1995 |
| WO | 2004016033 | A2 | 2/2004 |
| WO | 2006000091 | A1 | 1/2006 |
| WO | 2006022831 | A1 | 3/2006 |
| WO | 2007083230 | A2 | 7/2007 |

OTHER PUBLICATIONS

Philips: "Resource Allocation for E-DCH in CELL_FACH"; 3GPP TSG-RAN WG1 Meeting #51, R1-074625, Nov. 5, 2007, Retrieved From the Internet:URL:www.3gpp.org> 3 Page Document.

Hanada, "Three-Step Cell Search Algorithm for Broadband Multi-Carrier CDMA Packet Wireless Access", IEEE, 2001, pp. G-32-G37.

Garrett et al, "App Processing for High Performance MIMO Systems," IEEE Custom Integrated Circuits Conference, 2003, pp. 271-241.

Garrett et al, "Silicon Complexity for Maximum Likelihood MIMO Detection Using Spherical Decoding", IEEE Journal of Solid-State Circuits, Vol. 39, No. 9, Sep. 2004, pp. 1544-1552.

Rohde & Schwarz Product, "UMTS Long Term Evolution (LTE) Technology Introduction", Application Note 1MA111, 2007, pp. 1-32.

W-CDMA Mobile Communications System, John Wiley & Sons, Ltd, 2002, 426 Pages.

* cited by examiner

INDICATING E-DCH RESOURCES FOR E-RACH

FIELD OF THE INVENTION

This invention relates to a method for giving access to secondary station, and a primary station associated.

This invention is more specifically related to a mobile telecommunication system, like a UMTS system or a UMTS LTE communication system.

BACKGROUND OF THE INVENTION

In UMTS WCDMA there is a mechanism defined for Random Access transmission in the uplink. The User equipment UE (namely the base station) transmits a randomly-selected preamble signal characterised by:

Signature sequence (i.e. bit sequence)
Scrambling code,
Sub-channel (i.e. timing of the access slot in the frame)

If the base station receives the signature it acknowledges it on the Acquisition Indicator Channel (AICH) with a corresponding signature. If the UE receives a positive acknowledgement it transmits a message part on a RACH data channel.

If the UE does not receive an acknowledgement (or a negative acknowledgement indicated by an inverted signature on the AICH) it can make another attempt. The probability of collision depends on the number of Signature sequences, Scrambling codes, Access slots from which the UEs make their selection for the randomly-selected preamble signal.

Currently in 3GPP it is proposed that UEs can be configured to use a new mechanism, which is similar to RACH. For the purpose of this invention, the main difference is that the data transmission which follows the preamble transmission uses a high-speed uplink packet data channel, known as Enhanced Dedicated Channel (E-DCH), instead of a single short message associated directly with the RACH preamble. Unlike the RACH message, the E-DCH is characterised by power control, rate control, hybrid ARQ and the ability to transmit high data rates for an indefinite length of time, but in practice the detailed characteristics are not relevant to this invention. However, the means for indicating which E-DCH parameters the UE should use following a successful E-RACH access have not yet been decided.

For convenience we can refer to the mechanism for gaining uplink access using the existing RACH as "R99 RACH" and the new scheme as "E-RACH".

The resources from which the UE is permitted to make a random selection for the R99 RACH preamble signal transmission are broadcast on a broadcast channel (BCH) in each cell. The R99 RACH parameters which are signalled on the BCH are included for reference in the table below. This information is provided for one of more PRACHs (Physical RACHs):

| Information Element/Group name | Need | Multi | Type and reference | Semantics description | Version |
| --- | --- | --- | --- | --- | --- |
| >>Available Signature | MP | | Bit string(16) | Each bit indicates availability for a signature, where the signatures are numbered "signature 0" up to "signature 15". The value 1 of a bit indicates that the corresponding signature is available and the value 0 that it is not available. | |
| >>Preamble scrambling code number | MP | | Integer (0 . . . 15) | Identification of scrambling code] | |
| >>Available Sub Channel Number | MP | | Bit string (12) | Each bit indicates availability for a subchannel, where the subchannels are numbered "subchannel 0" to "subchannel 11". The value 1 of a bit indicates that the corresponding subchannel is available and the value 0 indicates that it is not available. | |

The parameters for E-RACH access are likely to be defined in a similar way.

One scheme for indicating the E-DCH resources (for the data transmission which follows the E-RACH preamble transmission) which has been proposed in R1-074303, "Resource assignment for E-DCH access in CELL_FACH state" Nokia Corporation, Nokia Siemens Networks, available at http://www.3gpp.org/ftp/tsg_ran/WG1_RL1/TSGR1_50b/Docs/R1-074303.zip, creates a link between the values of each of a group of multiple signatures sent on the AICH and a specific set of E-DCH parameters defined in a table, as can be seen below. Example of signature combinations from R1-074303, "Resource assignment for E-DCH access in CELL_FACH state":

| 2 PRACH signatures and 6 E-DCH resources - two associated AICH signatures per PRACH (4 in total) | | | 1 PRACH signatures and 7 E-DCH resources - three associated AICH signatures | | |
|---|---|---|---|---|---|
| UE transmitted PRACH preamble signature | Node B transmitted AICH signatures | E-DCH resource index | UE transmitted PRACH preamble signature | Node B transmitted AICH signatures | E-DCH resource index |
| 1 | 1, 2 (−1, −1) | NACK | 1 | 1, 2, 3 (−1, −1, −1) | NACK |
| 1 | 1, 2 (−1, +1) | 1 | 1 | 1, 2, 3 (−1, −1, +1) | 1 |
| 1 | 1, 2 (+1, −1) | 2 | 1 | 1, 2, 3 (−1, +1, −1) | 2 |
| 1 | 1, 2 (+1, +1) | 3 | 1 | 1, 2, 3 (−1, +1, +1) | 3 |
| 2 | 3, 4 (−1, −1) | NACK | 1 | 1, 2, 3 (+1, −1, −1) | 4 |
| 2 | 3, 4 (−1, +1) | 4 | 1 | 1, 2, 3 (+1, −1, +1) | 5 |
| 2 | 3, 4 (+1, −1) | 5 | 1 | 1, 2, 3 (+1, +1, −1) | 6 |
| 2 | 3, 4 (+1, +1) | 6 | 1 | 1, 2, 3 (+1, +1, +1) | 7 |

A number of problems exist with the solution proposed in R1-074303, "Resource assignment for E-DCH access in CELL_FACH state":

if the AICH signature space is not increased, it reduces the number of preambles available, as multiple AICH signatures are mapped to each preamble. This is likely to increases the collision probability for both R99 RACH and E-RACH.— the UE needs to detect multiple signatures.

There could be an impact on legacy UEs since the detection probability of acknowledgements for R99 RACH would be degraded by multiple signature transmissions.

A possible solution, also identified in R1-074303, "Resource assignment for E-DCH access in CELL_FACH state" is to increase the number of AICH signatures (up to 32). This has the disadvantage that the detection probability for legacy UEs of acknowledgements for R99 RACH would be degraded by multiple (new) signature transmissions.

Another solution would be to also use non-transmission of a signature to indicate a different resource. For example:

| UE transmitted PRACH preamble signature | Node B transmitted AICH signatures | E-DCH resource index |
|---|---|---|
| 1 | 1, 2 (−1, 0) | NACK |
| 1 | 1, 2 (−1, −1) | 1 |
| 1 | 1, 2 (−1, +1) | 2 |
| 1 | 1, 2 (+1, 0) | 3 |
| 1 | 1, 2 (+1, −1) | 4 |
| 1 | 1, 2 (+1, +1) | 5 |

This has the disadvantage of requiring more accurate signature amplitude detection at the UE.

As also mentioned in R1-074303, "Resource assignment for E-DCH access in CELL_FACH state", the E-DCH resource could be indicated by an independent set of signatures. In R1-074303, it is suggested that this would allow only one simultaneous acknowledgement on the AICH. However, this restriction would not apply if the limitation can be accepted that resource allocation would not be independent for two simultaneous acknowledgements.

For example in the following case:

| UE transmitted PRACH preamble signature | Node B transmitted AICH signatures | E-DCH resource index |
|---|---|---|
| 1 | 1, 3 (−1, −1) | NACK |
| 1 | 1, 3 (−1, +1) | 1 |
| 1 | 1, 3 (+1, −1) | 2 |
| 1 | 1, 3 (+1, +1) | 3 |
| 2 | 2, 3 (−1, −1) | NACK |
| 2 | 2, 3 (−1, +1) | 4 |
| 2 | 2, 3 (+1, −1) | 5 |
| 2 | 2, 3 (+1, +1) | 6 |

If preamble signature 1 is acknowledged with 1,3 (+1,+1), then preamble signature 2 can be acknowledged with 2,3 (−1,+1) indicating resource 4 or with 2,3 (+1,+1) indicating resource 6 (but NACK or resource 5 cannot be indicated).

To summarize, in UMTS WCDMA a new RACH-based uplink is being discussed. The request for uplink transmission resource is made using a mechanism based on the conventional RACH. The main difference from the conventional RACH is that the data transmission uses a high-speed uplink packet data channel, known as Enhanced Dedicated Channel (E-DCH), instead of a single short message associated directly with the RACH preamble. One proposed scheme for indicating the E-DCH resources to be used creates a link between the values of each of a group of multiple signatures sent on the AICH (to acknowledge the E-RACH access) and a specific set of E-DCH parameters defined in a table.

SUMMARY OF THE INVENTION

An object of the invention is to propose a method for signaling a resource to a secondary station being reliable for both legacy secondary stations and LTE secondary station.

Another object of the invention is to alleviate the above mentioned problems.

In accordance with one aspect of the invention, a method is proposed a primary station giving access to a resource to a secondary station, said method comprising the steps of (a) the secondary station transmitting to the primary station an access request to a resource;

(b) the primary station transmitting an acknowledgement indication of the access request and signalling independently from the transmission of the acknowledgement indication a set of resources to be used by the secondary station.

In accordance with another aspect of the invention, a primary station is proposed, said primary station comprising means for giving access to a secondary station to a resource, said primary station comprising receiving means for receiving an access request to a resource from the secondary station; and transmitting means for transmitting to the secondary station an acknowledgement indication of the access request and signalling independently from the transmission of the acknowledgement indication a set of resources to be used by the secondary station.

These and other aspects of the invention will be apparent from and will be elucidated with reference to the embodiments described hereinafter.

BRIEF DESCRIPTION OF THE DRAWING

The present invention will now be described in more detail, by way of example, with reference to the accompanying drawing, wherein.

DETAILED DESCRIPTION OF THE INVENTION

Figure 1:
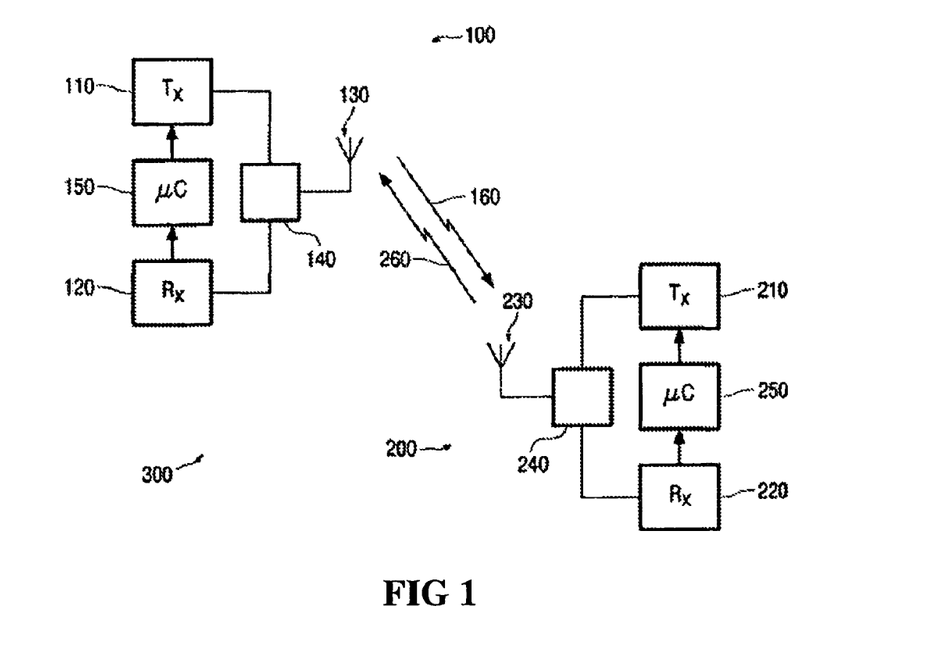
FIG. 1 is a block diagram of a system in which is implemented the invention.

The present invention relates to a system of communication 300 as depicted on FIG. 1, comprising a primary station 100, like a base station, and at least one secondary station 200 like a mobile station.

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to an antenna 130 or an antenna array comprising a plurality of antennas, by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna 230 or an antenna array comprising a plurality of antennas, by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a downlink channel 160 and transmission from the secondary radio station 200 to the first radio station 100 takes place on an uplink channel 260.

The invention proposes to signal the set of resources to be used independently from acknowledging the E-RACH access. One possible method is to transmit information in the unused portion of the AICH (corresponding to 1024 chips every slot) indicating the resource set.

According to an embodiment of the invention, a particular E-DCH resource is associated in a predetermined way to each E-RACH preamble, and the NodeB's response to a preamble is modified depending on whether or not the E-DCH resource associated with the preamble is available or not.

In another embodiment, the NodeB's response to a preamble comprises only ACK or NACK if the associated E-DCH resource is available, whereas the NodeB's response further comprises an indication of a different resource if the associated E-DCH resource is not available.

The invention therefore has the advantage that the amount of signalling to allocate the E-DCH resources, and hence also the amount of interference generated to other preamble acknowledgement signalling, can be reduced.

The indication of a different resource may comprise the transmission of one or more additional signatures, and/or some additional signalling bits in a reserved field at the end of the normal acknowledgement signal.

In different embodiments the preamble and/or the resource allocation signalling may comprise a combination of a signature and a timeslot, or just a timeslot, or just a signature.

Another aspect of the invention is based on the recognition that multiple sets of E-DCH resources can be created and the particular resource indicated by identifying both the set, and the member of the set (using an index as mentioned above). Different sets can conveniently be created by changing the uplink scrambling codes.

Therefore if a given E-DCH resource is associated with each possible signature, forming a set of resources, then additional sets of resources (corresponding to the same signatures) can easily be defined by changing each uplink scrambling code.

If sufficient sets of E-DCH resources are created, there is a low probability of collision with an existing resource-use if the same set of E-DCH resources applies for all E-RACH signatures that are acknowledged at the same time using the AICH.

We propose to signal the set of resources to be used independently from acknowledging the E-RACH signature. One possible method is to transmit information in the unused portion of the AICH (corresponding to 1024 chips every slot) indicating the resource set.

Another possible method is to use a sub-set of AICH signatures to indicate the resource set.

Another aspect of the invention is based on the recognition that the association between E-DCH resources and E-RACH preambles can be used to trade off the collision probability against the blocking probability.

In general, the smaller the number of configured E-RACH preambles the higher the collision probability (because the probability of multiple UEs randomly selecting the same E-RACH preamble increases), and the smaller the number of configured E-DCH resources the higher the blocking probability (because the probability that no suitable E-DCH resources are available increases).

The total number of bits required for the response to the E-RACH preamble in order to allocate an E-DCH resource increases with both the number of configured E-RACH preambles and the number of configured E-DCH resources. Assuming that binary signalling is used to indicate the allocated E-DCH resource, the maximum number of bits required is given by $P \cdot \lceil \log_2(E) \rceil$, where P is the number of configured E-RACH preambles and E is the number of configured E-DCH resources. This enables any E-DCH resource to be allocated in response to any E-RACH preamble, with any combination of E-RACH preambles being transmitted simultaneously.

Thus for a given number of bits for E-DCH resource allocation, it is possible for example to reduce the collision probability by configuring more E-RACH preambles, at the expense of increasing the blocking probability by configuring a smaller number of E-DCH resources.

However, the amount of freedom for this trade off is quite limited. For example, with 16 bits available for E-DCH resource allocation, only 3 E-RACH preambles can be configured if 32 E-DCH resources are configured. By reducing the number of configured E-DCH resources to 8, still only 5 E-RACH preambles can be configured.

According to this aspect of the invention, the E-DCH resources and E-RACH preambles are divided into subsets if full flexibility of allocation cannot be achieved within the available number of resource allocation bits.

For example, consider the above example with 32 configured E-DCH resources: Suppose the required collision probability needs 32 configured E-RACH preambles. Then according to this aspect of the invention, the 32 configured E-DCH resources are subdivided into 4 subsets of 8 resources. Likewise, the 32 configured E-RACH preambles are subdivided into 4 subsets of 8 resources. A one-to-one mapping is defined between the E-RACH preamble subsets and the E-DCH resource subsets. A UE wishing to access the network then makes a random selection of any one of the E-RACH preambles. The subset containing the selected preamble indicates a subset of E-DCH resources, and the network then only needs 3 bits in order to indicate which of the 8 E-DCH resources within the subset is allocated to the UE. Thus a low collision probability can be achieved in conjunction with a low blocking probability, with only a small loss of flexibility.

Figure 2:
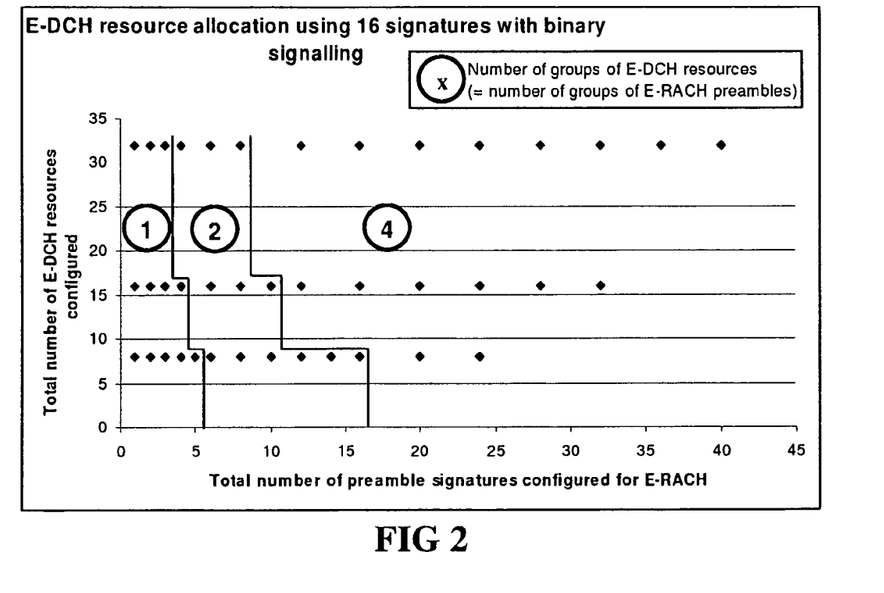
FIG. 2 is a graph showing the numbers of E-RACH preambles and E-DCH resources that can be configured with different degrees of division into subsets in accordance with an embodiment of the invention.

As an example, the graph of FIG. 2 shows the numbers of E-RACH preambles and E-DCH resources that can be configured with different degrees of division into subsets, assuming that 16-bit binary signalling is used to allocate the resources.

Figure 3:
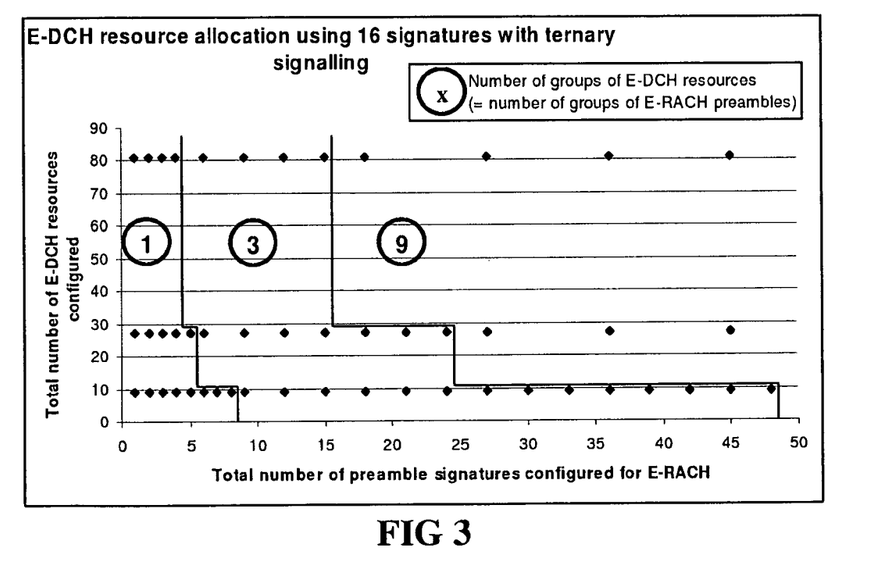
FIG. 3 is a graph showing the numbers of E-RACH preambles and E-DCH resources that can be configured with different degrees of division into subsets in accordance with another embodiment of the invention.

A further example is given in FIG. 3, showing the numbers of E-RACH preambles and E-DCH resources that can be configured with different degrees of division into subsets, assuming that 16-bit ternary signalling is used to allocate the resources.

In another embodiment, the invention is applied in UMTS WCDMA. Resources for each PRACH are broadcast using the BCH. Some UEs are configured to use E-RACH, for example by means of higher-layer signalling. The resources available for E-RACH access are also configured for these UEs via the BCH.

A successful E-RACH access is indicated by a positive acknowledgement on the AICH. The transmission resources to be used on the E-DCH are indicated by signalling bits. In a preferred embodiment these bits are transmitted using an unused portion of the AICH.

In a further embodiment the E-DCH resources are determined by reference to the E-RACH signature selected for the E-RACH access attempt. For example, the relationship between signature and E-DCH resource is indicated using a table. The table also indicates the EDCH resource corresponding to each possible set of values of the signalling bits sent on the unused part of the AICH (or by other means).

In a further embodiment the different E-DCH resources indicated by the signalling bits, but corresponding to the same E-RACH signature, differ only in terms of scrambling code.

The text below gives additional information.

In R1-074976, "Enhanced Uplink for CELL_FACH", Philips, available at http://www.3gpp.org/ftp/tsg_ran/WG1_RL1/TSGR1_51/Docs/R1-074976.zip, we discussed a number of issues related to the use of RACH preambles for the initial phase of starting Enhanced Uplink in Cell_FACH. In this paper we focus on the E-DCH resource allocation phase.

Note that in this paper, when we refer to "E-DCH Resource" we mean a combination of an UL scrambling code, E-RNTI, F-DPCH code and time-offset, E-RGCH/E-HICH code and signatures, and E-AGCH code.

E-DCH Resource Allocation Methods—Overview of Possibilities:

In general, two extreme possibilities may be identified:
1) Each E-RACH preamble is directly associated with one E-DCH resource. The E-DCH resource is effectively selected randomly by the UE, and no additional resource allocation signalling is transmitted by the NodeB when acknowledging the preamble. If the E-DCH resource corresponding to the preamble selected by the UE is already in use, the NodeB responds to the preamble with a NACK on the AICH.
2) There is no predetermined association between E-RACH preambles and E-DCH resources. The allocation of E-DCH resources is carried out by the eNodeB and signalled in response to an E-RACH preamble.

Intermediate cases are also possible, where an association exists between each E-RACH preamble and a set of E-DCH resources. When the UE selects a preamble it therefore also selects a corresponding set of E-DCH resources, and the particular E-DCH resource within that set is selected by the NodeB and signalled in response to the preamble.

As discussed in R1-074976, "Enhanced Uplink for CELL_FACH", Philips, available at http://www.3gpp.org/ftp/tsg_ran/WG1_RL1/TSGR1_51/Docs/R1-074976.zip, in all cases the total set of E-DCH resources available should be broadcast, so that any signalling by the NodeB can simply comprise an index.

E-DCH Resource Allocation Signalling:

The main factor governing which of the above methods should be used depends on how many signalling bits can be transmitted when the NodeB responds to an E-RACH preamble.

If no bits are available (i.e. the NodeB simply sends a conventional AICH response with no extension), then option (1) (each E-RACH preamble directly associated with one E-DCH resource) should be used. However, in our view, the set-up delay associated with option (1) is likely to be too long. This is because the collision probability becomes limited by the number of E-DCH resources available, not the number of E-RACH preambles available. Whenever a UE happens to select a preamble corresponding to an E-DCH resource which is already in use, it has to start again with random preamble selection.

Therefore possibilities for reducing the delay of option (1) might be considered, for example:
use the reserved part at the end of the AICH to broadcast the indices of the E-DCH resources which are not yet in use, so that the UE can select a corresponding E-RACH preamble, and/or
shorten the power ramping phase. For example by omitting the power-ramping phase of the RACH for a subsequent access attempt if the UE's first preamble transmission of the previous attempt is NACK'ed. (If the UE has already established a power level at which its first preamble was acknowledged, it introduces unnecessary delay if the UE has to start with a lower power level when selecting a different preamble. The process could be speeded up by allowing the UE to use the same power level as for the previous NACK'ed preamble.)

However, in practice it seems entirely possible to transmit a few additional signalling bits together with the AICH response. Possible methods for this include:
1) using certain existing AICH signatures, or groups of simultaneously-transmitted signatures, to allocate E-DCH resources, as proposed in [2]
2) extending the number of available AICH signatures, and using them for signalling, as also proposed in [2]
3) signalling using the reserved part at the end of the AICH.

Method (1) used on its own without extending the information-carrying ability of the AICH reduces the number of signatures available for access requests and therefore results in an increased collision probability. Therefore we do not prefer such a solution.

The number of bits available with each of methods (2) and (3) needs further evaluation. In principle, 16 additional signatures are available with method (2), although this would generate some additional interference to existing R99 AICH responses which needs to be evaluated. The number of bits available with method (3) is more limited (8 bits with SF256), but does not cause interference to existing AICH responses.

The amount of interference could be reduced in a default resource is indicated by sending only an ACK on the AICH, and in case this resource is not available, another may be indicated by sending additional signalling bits.

Both of these methods 2) and 3) (or even a combination of the two) should be evaluated further.

As a conclusion, if the E-DCH resource allocation is indicated entirely by the choice of E-RACH preamble then methods for reducing the delay might be considered, for example:
use the reserved part at the end of the AICH to broadcast the indices of the E-DCH resources which are not yet in use, so that the UE can select a corresponding E-RACH preamble,
shorten the power ramping phase.

If additional signalling bits are used to indicate the E-DCH resource allocation, we propose to transmit a few additional signalling bits together with the AICH response. Possible methods for this include:
extending the number of available AICH signatures, and using them for signalling, as also proposed in R1-074303, "Resource assignment for E-DCH access in CELL_FACH state",
signalling using the reserved part at the end of the AICH.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and which may be used instead of or in addition to features already described herein.

The invention claimed is:

1. A method of a primary station giving a secondary station access to a resource:
receiving from the secondary station, a preamble for requesting access to the resource, wherein each resource is associated in a predetermined way to each preamble;
modifying a response to the preamble depending on whether or not the resource associated with the preamble is available;
transmitting only an acknowledgement indication of the access request when the resource associated with the preamble is available; and
transmitting an acknowledgement indication and an identification of a different resource for use by the secondary station when the resource associated with the preamble corresponds with a high-speed uplink data packet channel and the resource is not available.

2. The method of claim 1, wherein the different resource is identified by transmitting information indicating the resource in an unused portion of an AICH.

3. The method of claim 1, wherein the indication of a different resource may comprise transmission of one or more additional signatures, and/or some additional identifying bits in a reserved field at the end of the normal acknowledgement signal.

4. The method of claim 1, wherein the preamble comprises at least one of a signature and a timeslot.

5. The method of claim 1, wherein resources are grouped into a plurality of sets of resources and each particular resource is indicated by identifying both the set, and an index in the set.

6. A primary station for giving a secondary station access to a resource, said primary station comprising:
a receiving circuit configured to receive an access request to a resource including a preamble for requesting access to the resource from the secondary station wherein each resource is associated to each preamble; and
a processing circuit configured to transmit to the secondary station, via a transmitting circuit and in response to the access request, an acknowledgement indication of the access request and an indication of a different resource for use by the secondary station when a requested resource is associated with a high-speed uplink data packet channel and the requested resource is not available and to respond to the access request with only an acknowledgement when the the requested resource is available.

7. A method of a primary station giving access to a resource to a secondary station, said method comprising:
receiving from the secondary station, an access request to a resource including a preamble for requesting access to the resource, wherein each resource is associated to each preamble;
modifying a response to the access request depending on whether or not the resource associated with the preamble is available;
transmitting an acknowledgement indication of the access request, and an indication of a different resource to be used by the secondary station when a requested resource is associated with a high-speed uplink data packet channel and the requested resource is not available, wherein when the requested resource is available, transmitting only an acknowledgement.

8. The method of claim 7, wherein the indication of a different resource comprises at least one of a transmission of one or more additional signatures, and some additional signaling bits in a reserved field at an end of the acknowledgement indication.

9. A secondary station for request from a primary station access to a resource, said secondary station comprising:
- a transmitter circuit configured to transmit to a primary station an access request to a resource including a preamble for requesting access to the resource, wherein each resource is associated to each preamble; and
- a processing circuit configured to receive, via a receiving circuit, from the primary station an acknowledgement indication of the access request and an indication of a different resource to be used by secondary station when the a requested resource is associated with a high-speed uplink data packet channel and the requested resource is not available, and when the requested resource is available to receive only an acknowledgment.

10. The secondary station of claim 9, wherein the processing circuit is further configured to receive, via the receiving circuit, the indication of the different resource in an unused portion of an Acquisition Indicator Channel (AIM).

11. The secondary station of claim 9, wherein the processing circuit is further configured to receive, via the receiving circuit, additional signaling bits in a reserved field following an end of the acknowledgement indication, the additional signaling bits corresponding to the indication of the different resource.

12. The secondary station of claim 9, wherein the access request comprises at least one of a signature and a timeslot.

* * * * *